(12) United States Patent
Ernst et al.

(10) Patent No.: US 7,039,110 B2
(45) Date of Patent: May 2, 2006

(54) METHODS OF AND UNITS FOR MOTION OR DEPTH ESTIMATION AND IMAGE PROCESSING APPARATUS PROVIDED WITH SUCH MOTION ESTIMATION UNIT

(75) Inventors: Fabian Edgar Ernst, Eindhoven (NL); Piotr Wilinski, Eindhoven (NL); Cornelius Wilhelmus Antonius Marie Van Overveld, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 156 days.

(21) Appl. No.: 10/186,653

(22) Filed: Jul. 1, 2002

(65) Prior Publication Data

US 2003/0007667 A1    Jan. 9, 2003

(30) Foreign Application Priority Data

Jun. 7, 2001  (EP)  .................... 01202615

(51) Int. Cl.
*H04N 7/12*  (2006.01)
*G06K 9/46*  (2006.01)

(52) U.S. Cl. ............... 375/240.16; 348/699; 382/240
(58) Field of Classification Search ........... 375/240.16, 375/240.24; 348/699; 382/107, 240, 173, 382/164
See application file for complete search history.

(56) References Cited

U.S. PATENT DOCUMENTS

| 5,142,360 | A | * | 8/1992 | Niihara | 348/699 |
| 5,576,767 | A | * | 11/1996 | Lee et al. | 375/240.14 |
| 5,608,458 | A | * | 3/1997 | Chen et al. | 375/240.14 |
| 5,929,940 | A | * | 7/1999 | Jeannin | 348/699 |
| 5,995,668 | A | * | 11/1999 | Corset et al. | 382/233 |
| 6,084,908 | A | * | 7/2000 | Chiang et al. | 375/240.03 |
| 6,766,037 | B1 | * | 7/2004 | Le et al. | 382/107 |

OTHER PUBLICATIONS

Dufaux et al: "Motion Estimation Techniques For Digital TV: A Review Ad A New Contribution" Proceedings Of The IEEE, vol. 83, No. 6, Jun. 1995, pp. 858-875.
Sune et al: "Depth-From-Motion Estimation Based On A Multiscale Analysis Of Motion Constraint Equation Validity" Proceedings Of The International Conference On Image Processing (ICIP) . IEEE Comp. SOC. Press, US, vol. 1, Oct. 23, 1995, pp. 402-405.
Schutten et al: "Layered motion estimation" Philips Journal Of Research, vol. 51, No. 2, 1998, pp. 253-267.

* cited by examiner

*Primary Examiner*—Gims Philippe
*Assistant Examiner*—Erick Rekstad

(57) ABSTRACT

In the method of motion estimation a tree (120) of segments (102–114) of an image (100) is generated by performing a hierarchical segmentation. The tree (120) of segments is analyzed to control the generation of a set (118) of candidate motion vectors of a segment (104). For the motion vectors of the set (118) match penalties are calculated. Finally, a particular motion vector (116) is selected from the set (118) of candidate motion vectors on the basis of match penalties. In the method of depth estimation depth data is calculated on the basis of a motion vector and the rules of parallax.

11 Claims, 6 Drawing Sheets

Figure 1:
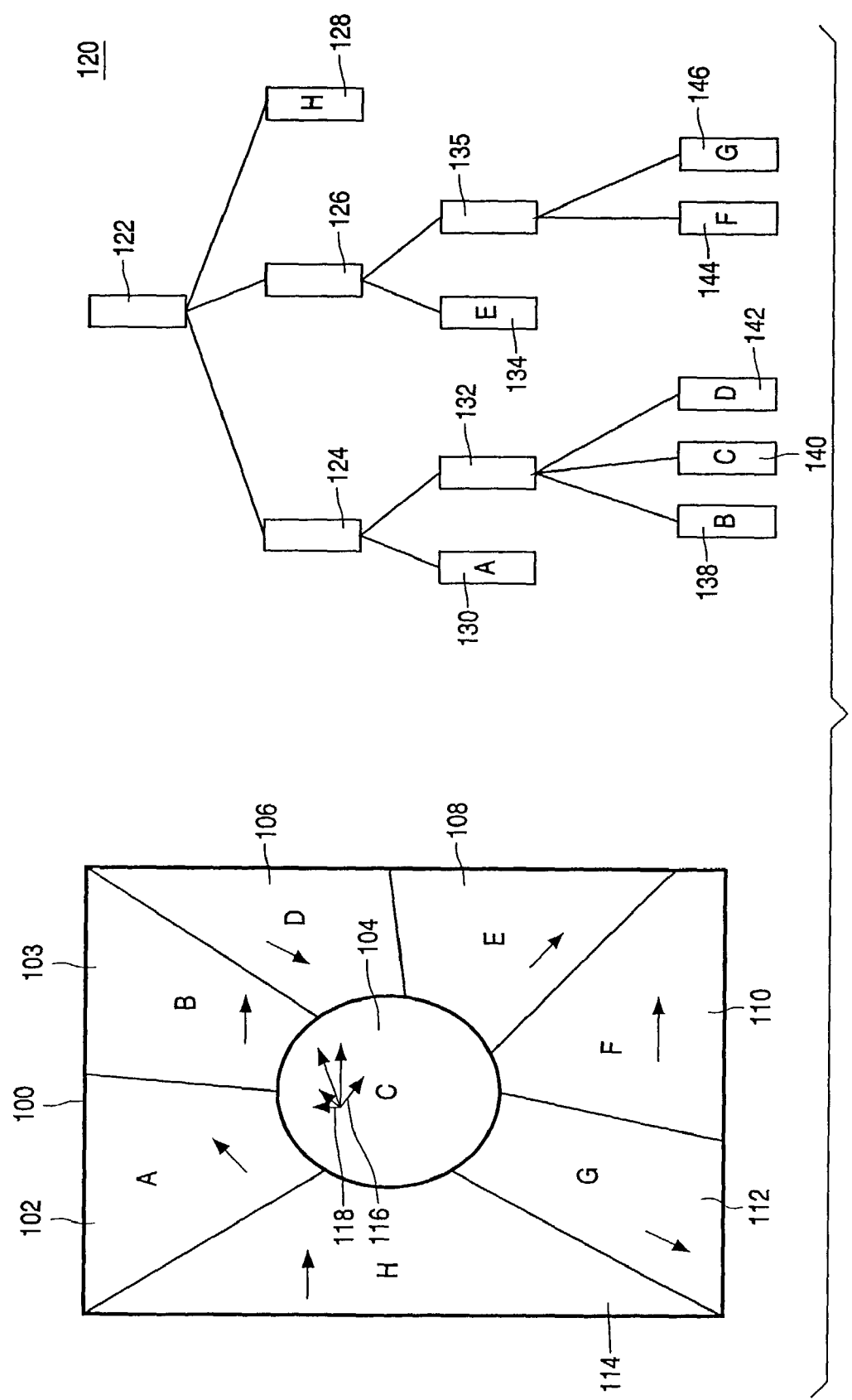

METHODS OF AND UNITS FOR MOTION OR DEPTH ESTIMATION AND IMAGE PROCESSING APPARATUS PROVIDED WITH SUCH MOTION ESTIMATION UNIT

The invention relates to a method of motion estimation of segments of an image, comprising the steps of:
  generating a set of candidate motion vectors of a particular segment;
  computing for each candidate motion vector a match penalty; and
  selecting a particular motion vector from the set of candidate motion vectors on the basis of match penalties.

The invention further relates to a motion estimator unit for motion estimation of segments of an image, comprising:
  a generator for generating a set of candidate motion vectors of a particular segment;
  a computing means for computing for each candidate motion vector a match penalty; and
  a selecting means for selecting a particular motion vector from the set of candidate motion vectors on the basis of match penalties.

The invention further relates to a method of depth estimation of segments of an image, comprising the steps of:
  generating a set of candidate motion vectors of a particular segment;
  computing for each candidate motion vector a match penalty;
  selecting a particular motion vector from the set of candidate motion vectors on the basis of match penalties; and
  calculating depth data of the particular segment on the basis of the particular motion vector.

The invention further relates to a depth estimator unit for depth estimation of segments of an image, comprising:
  a generator for generating a set of candidate motion vectors of a particular segment;
  a computing means for computing for each candidate motion vector a match penalty;
  a selecting means for selecting a particular motion vector from the set of candidate motion vectors on the basis of match penalties; and
  a depth calculating means for calculating depth data of the particular segment on the basis of the particular motion vector.

The invention further relates to an image processing apparatus comprising:
  a motion estimator unit for motion estimation of segments of an image, comprising:
    a generator for generating a set of candidate motion vectors of the particular segment;
    a computing means for computing for each candidate motion vector a match penalty; and
    a selecting means for selecting a particular motion vector from the set of candidate motion vectors on the basis of match penalties; and
  a motion compensated image processing unit.

A method of motion estimation of the kind described in the opening paragraph is known from the article "True-Motion Estimation with 3-D Recursive Search Block Matching" by G. de Haan et. al. in IEEE Transactions on circuits and systems for video technology, vol.3, no.5, October 1993, pages 368–379.

Motion estimation has been used with success in video applications for motion compensated image processing like scan-rate up-conversion, de-interlacing and temporal noise reduction. A category of motion estimation algorithms is called "Block matching". Block matching algorithms are iterative minimization algorithms which assume that all pixels within a given block move uniformly. For that block a match penalty is minimized with respect to possible motion vector candidates. A match penalty might be e.g. the Sum of Absolute differences (SAD) or Mean Squared Error (MSE). Typically, blocks are 8 by 8 pixels. However the principle of estimating motion vectors by minimization of a match penalty works also for segments with an irregular shape. In that case, the motion estimation/match penalty computation is segment based. Segment boundaries might be aligned with luminosity or color discontinuities. In this way, segments can be interpreted as being objects or parts of objects in the scene.

The speed of the method of finding the best motion vectors of the various segments of an images depends on the number of segments, the size of these segments and on the number of possible candidate motion vectors of each segment. The accuracy depends on two factors:
  Firstly, the size of the segments, since larger segments are less prone to noise. However the size is restricted by the fact that the motion of the segment should be constant. Hence, segments should preferably coincide with the largest region still having the same motion.
  Secondly, the choice of the candidate motion vectors. If only a limited number of candidate motion vectors is tested, a good choice of the candidate motion vectors is crucial. In the cited article the candidate set comprises the current motion vectors of neighboring blocks, augmented with some random candidate motion vectors. The underlying assumption is that neighboring blocks may have a similar motion. However, neighboring blocks are only likely to have the same motion if they belong to the same object. Hence, trying candidate motion vectors which are not likely to belong to the same object is wasted computational effort. It is a disadvantage of the known method that time and computational effort are wasted.

It is known that the steps of a method of motion estimation may be followed by a calculating step to obtain a method of depth estimation. The following problem is considered: given a series of images of a static scene taken by a camera with known motion, depth information should be recovered. All apparent motion in the series of images results from parallax. Differences in motion between one segment and another indicate a depth difference. Indeed, analyzing two consecutive images, the parallax between a given image segment at time t and the same segment at t+1 can be computed. This parallax corresponds to the motion of different parts of the scene. In the case of translation of the camera, objects in the foreground move more than those in the background. By applying geometrical relations, the depth information can be deduced from the motion. This concept is described by P. Wilinski and K. van Overveld in the article "Depth from motion using confidence based block matching" in Proceedings of Image and Multidimensional Signal Processing Workshop, pages 159–162, Alpbach, Austria, 1998.

It is a first object of the invention to provide a method of motion estimation of the kind described in the opening paragraph with an improved performance.

It is a second object of the invention to provide a motion estimator unit of the kind described in the opening paragraph with an improved performance.

It is a third object of the invention to provide a method of depth estimation of the kind described in the opening paragraph with an improved performance.

It is a fourth object of the invention to provide a depth estimator unit of the kind described in the opening paragraph with an improved performance.

It is a fifth object of the invention to provide an image processing apparatus of the kind described in the opening paragraph with an improved performance.

The first object of the invention is achieved in that the method of motion estimation further comprises the steps of:
   generating a tree of the segments of the image by performing a hierarchical segmentation; and
   analyzing the tree of the segments to control the generation of the set of candidate motion vectors of the particular segment.

The hierarchical segmentation provides information on the likeliness of segments belonging to the same object due to the tree structure of the segmentation. The tree has a single node at the highest level, which is called the root. Each node in the tree has a unique parent at a next higher level. Each segment corresponds with a node of the tree. A parent segment has child segments. An example of a hierarchical segmentation method is known from U.S. Pat. No. 5,867,605. The performance, i.e. speed and/or accuracy of the method of motion estimation can be improved with the aid of the tree in two manners: top-down and bottom-up. The advantage in both cases is that the number of candidate vectors for which match penalties have to be calculated is relatively low.

In an embodiment of the method of motion estimation according to the invention, the motion vectors of the segments of the tree are estimated by processing the tree of the segments recursively in a top-down direction. This may be done according to the following procedure:
   The estimation of the appropriate motion vectors starts on high level of the tree, where the segments are still large.
   If no satisfactory motion vector is found for a segment, then motion vectors are estimated for all children of this node separately.
   The previous step is repeated recursively until satisfactory motion vectors are obtained.

In this manner, the number of segments to be matched is minimal, without sacrificing the accuracy. The process of estimating motion vectors continues until satisfactory motion vectors are obtained. The result is that only motion vectors are estimated for segments at a relatively high level in the tree. The advantage is that the process stops with the largest, and thus least noise-prone, segments possible.

In a modification of the embodiment of the method of motion estimation according to the invention, the motion vectors are estimated of segments, corresponding to children of a node of the tree that corresponds to the particular segment, if a match penalty of the particular motion vector is unsatisfactory. The advantage of this stop criterion is its simplicity. Another criterion might be based on comparing match penalties of the motion vector of a parent segment and the motion vectors of the children segments. However applying this latter criterion implies extra computations.

In an embodiment of the method of motion estimation according to the invention, the motion vectors of the segments of the tree are estimated by processing the tree of the segments in a bottom-up direction. A least common ancestor of two segments is defined as the lowest node in the tree which is on the path from root to each of those segments. Segments which have a least common ancestor at a low position in the tree are more likely to belong to the same object than segments which have a least common ancestor high in the tree. This information can be used to restrict the number of candidate motion vectors by taking only the relevant neighbors into account.

In an embodiment of the method of motion estimation according to the invention, the step of generating the set of candidate motion vectors of the particular segment comprises the following sub-steps of:
   generating an initial list of candidate motion vectors comprising motion vectors of neighboring segments;
   ordering the initial list of candidate motion vectors according to positions of the corresponding nodes within the tree; and
   restricting the initial list of candidate motion vectors to candidate motion vectors with a relatively high order, resulting in the set of candidate motion vectors.

The motion vectors of the neighboring segments are put in order of importance. The importance is related to the position in the tree of the least common ancestor of the particular segment and the neighboring segment under consideration. The lower the position of the least common ancestor in the tree, the more important the candidate motion vector.

The second object of the invention is achieved in that the motion estimator unit further comprises:
   a segmentation means for generating a tree of the segments of the image, designed to perform a hierarchical segmentation; and
   an analyzing means for analyzing the tree of the segments to control the generator.

Modifications of the motion estimator unit and variations thereof may correspond to modifications and variations thereof of the method described.

The third object of the invention is achieved in that the method of depth estimation further comprises the steps of:
   generating a tree of the segments of the image by performing a hierarchical segmentation; and
   analyzing the tree of the segments to control the generation of the set of candidate motion vectors of the particular segment.

The fourth object of the invention is achieved in that the depth estimator unit further comprises:
   a segmentation means for generating a tree of the segments of the image, designed to perform a hierarchical segmentation; and
   an analyzing means for analyzing the tree of the segments to control the generator.

The fifth object of the invention is achieved in that the motion estimator unit of the image processing apparatus further comprises:
   a segmentation means for generating a tree of the segments of the image, designed to perform a hierarchical segmentation; and
   an analyzing means for analyzing the tree of the segments to control the generator.

Figure 2A:
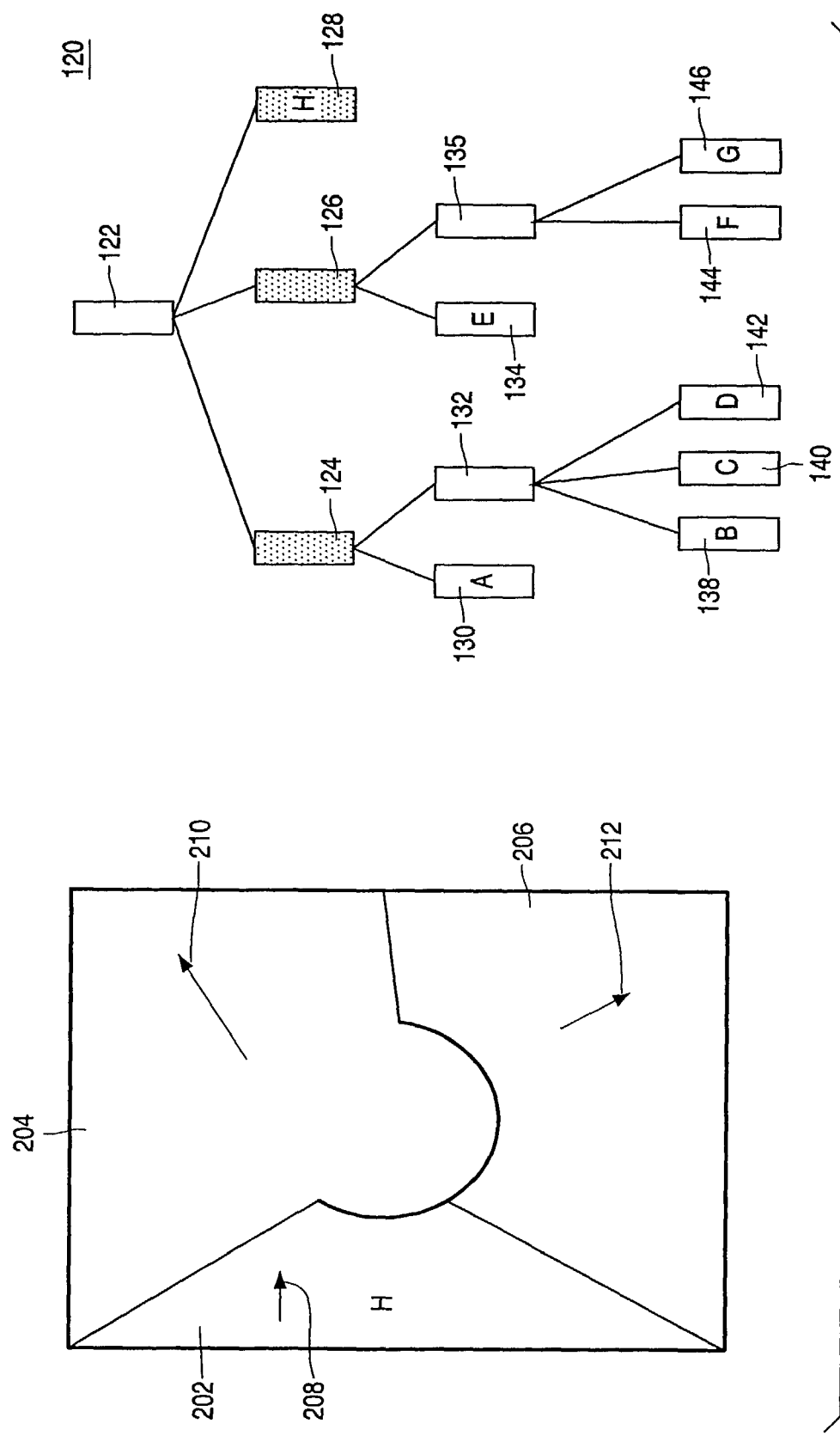
Figure 2B:
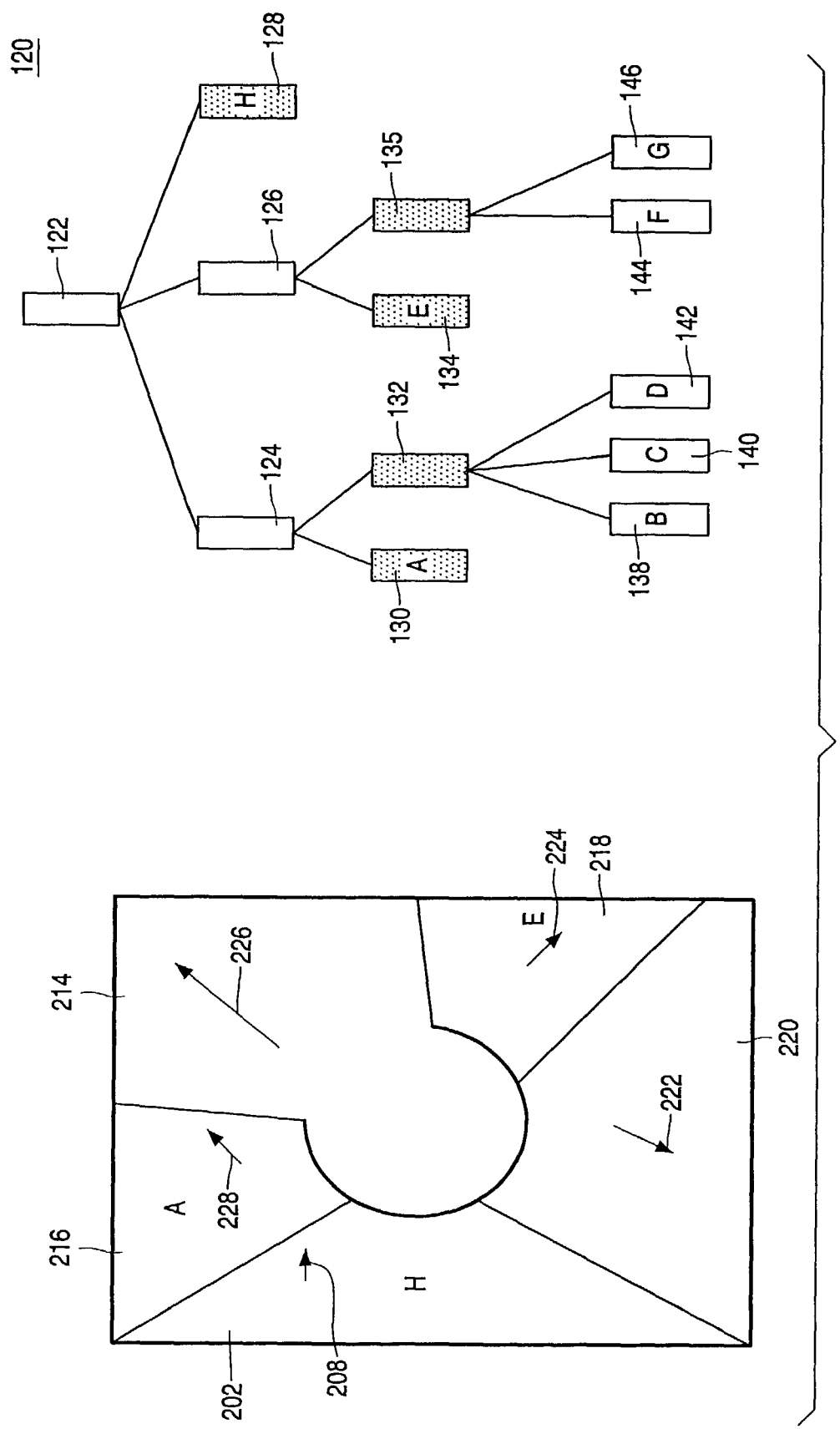
Figure 2C:
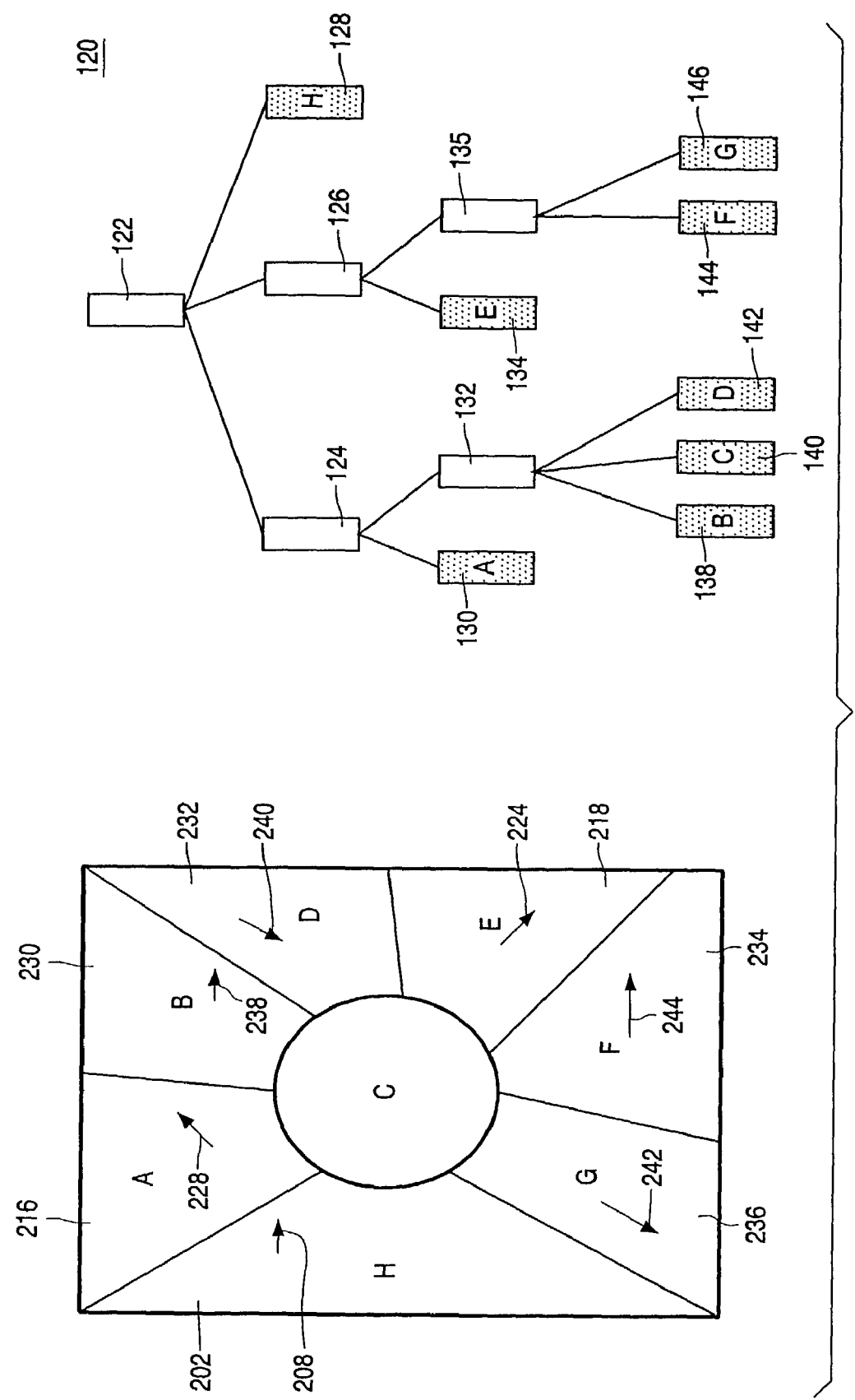

These and other aspects of the methods of and units for motion or depth estimation and of the image processing apparatus according to the invention will become apparent from and will be elucidated with respect to the implementations and embodiments described hereinafter and with reference to the accompanying drawings, wherein:

FIG. 1 shows an image segmented into 8 segments and the corresponding tree;

FIG. 2A schematically shows the segments for which motion vectors are estimated in the case of a top-down approach, at the second highest level of hierarchy of the tree;

FIG. 2B schematically shows the segments for which motion vectors are estimated in the case of a top-down approach, at the third highest level of hierarchy of the tree;

FIG. 2C schematically shows the segments for which motion vectors are estimated in the case of a top-down approach, at the lowest level of hierarchy of the tree.

Figure 3A:
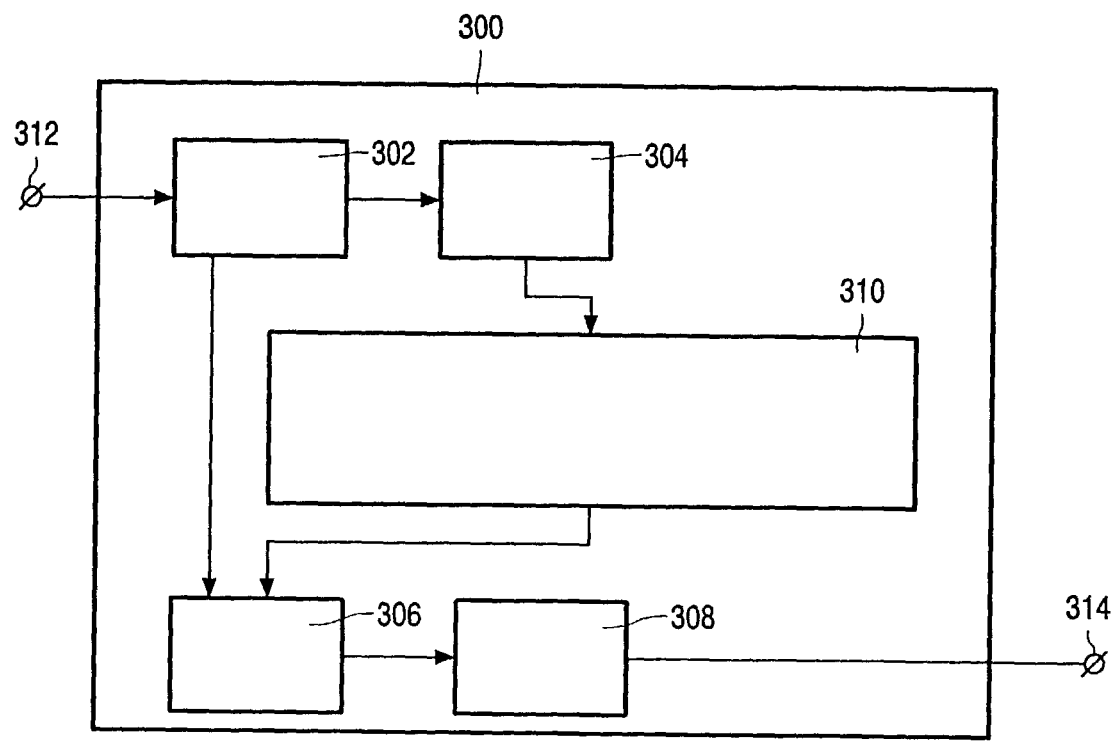
Figure 3B:
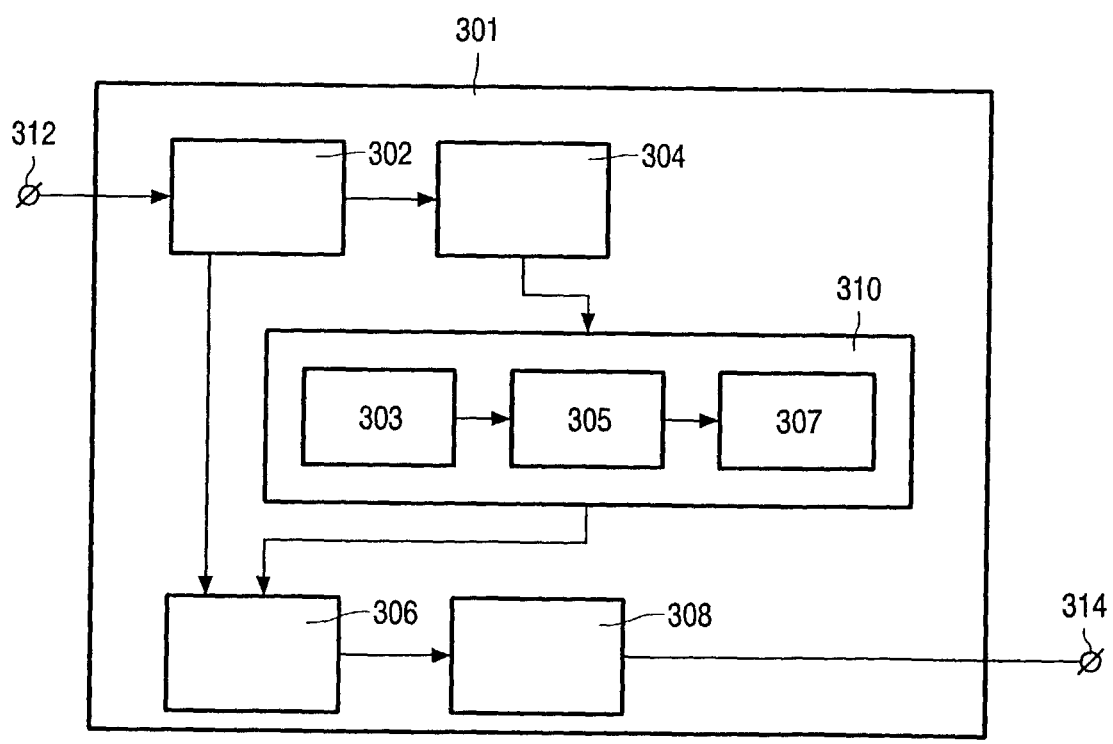
Figure 4:
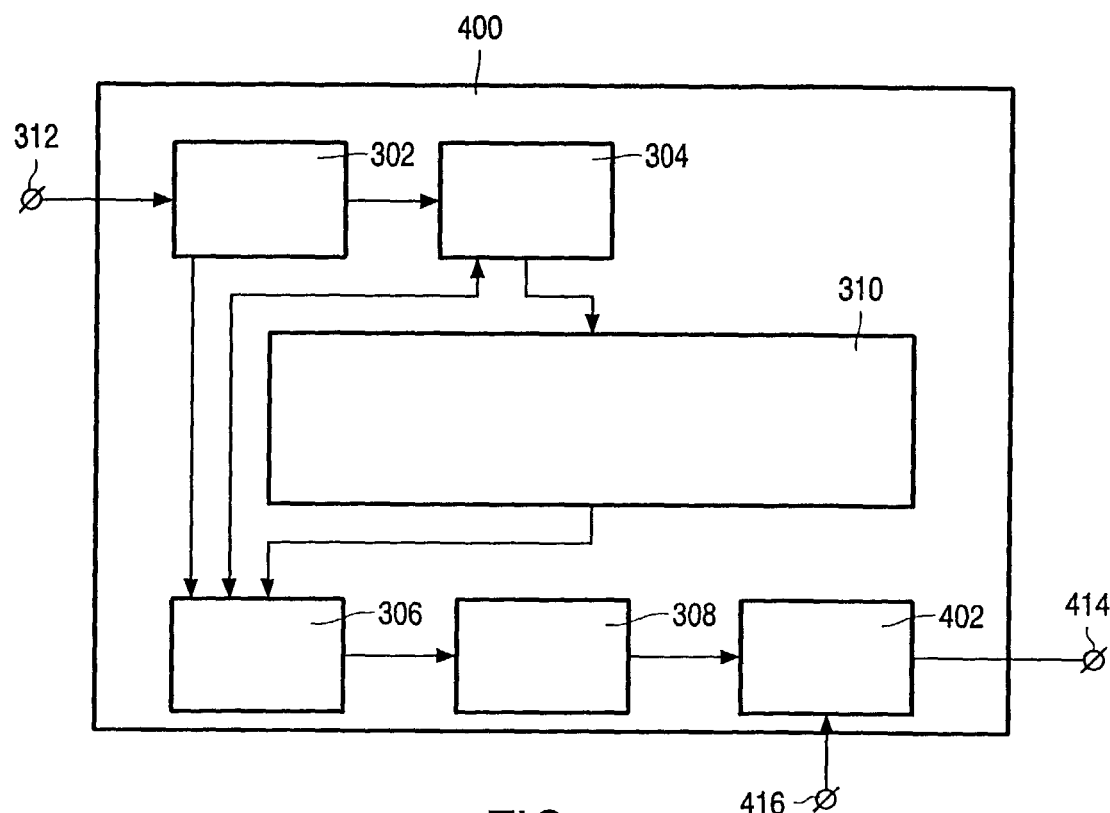

FIG. 3A schematically shows elements of a motion estimator designed for a top-down approach;

FIG. 3B schematically shows elements of a motion estimator unit designed for a bottom-up approach;

FIG. 4 schematically shows elements of a depth estimator unit; and

Figure 5:
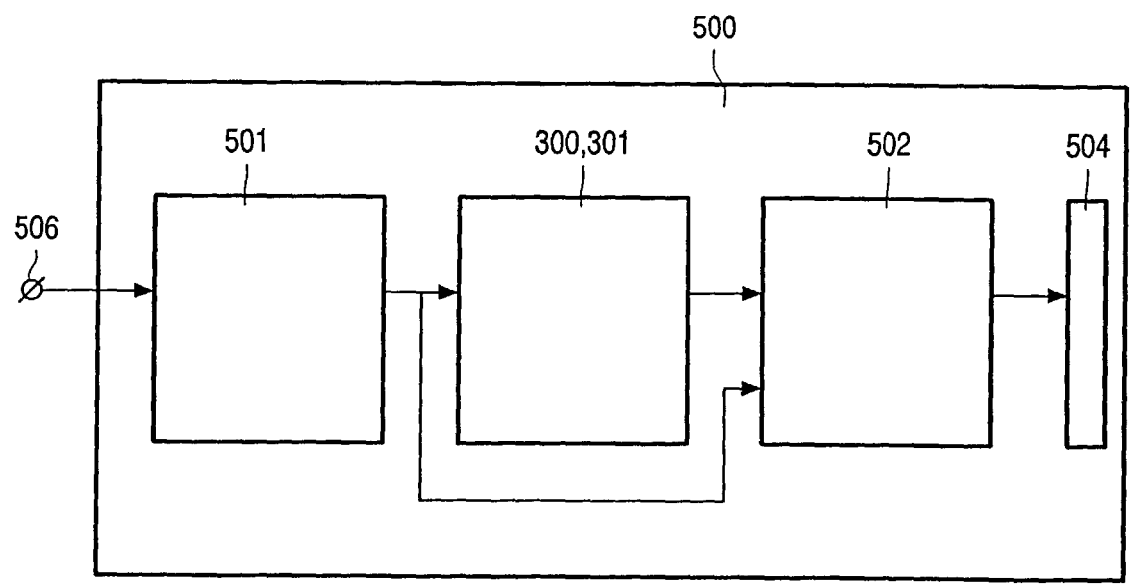

FIG. 5 schematically shows elements of an image processing apparatus. Corresponding reference numerals have the same meaning in all of the Figures.

FIG. 1 shows an image 100 hierarchically segmented into 8 segments 102–114 and the corresponding tree 120. The tree has 13 nodes 122–146 from which node 122 is called the root. Each node 122–146 corresponds to a segment of the image 100. For some nodes it is indicated to which segment of the image 100 it corresponds, e.g. node 130 corresponds to segment 102. References are provided for convenience, A–H.

The concept of hierarchical segmentation will be explained briefly. Hierarchical segmentation is a region-based segmentation technique in which segments in the image are determined that satisfy a certain homogeneity criterion. Subsequently, these segments are extended, e.g. grown by continuously varying the homogeneity parameter, such that the union of segments covers the whole image. Then the segmentation is complete. The basic approach consists of the following steps:

A criterion for the homogeneity is chosen, e.g. the variance of the luminosity in a segment around a pixel. This means that it is decided whether or not a pixel can be considered as part of on initial segment on the basis of the luminosity variance in a region around the pixel.

For each value of the homogeneity criterion the resulting segments can be calculated. However preferably it is done for some pre-determined thresholds. Each threshold corresponds with a level of hierarchy in the tree.

A tree structure is built for the segments. Note that if for a certain value of the threshold a segment exists, this segment exists also for all higher values of the threshold. If the threshold increases, segments can grow larger, and segments which are separated for a low value for the threshold might merge at a higher level of the threshold. However, because of the way the segments are created, it can never happen that segments decrease in size or are split if the threshold increases.

Optionally this tree is pruned to achieve separated segments.

Optionally segments are grown by means of a morphological operation.

The free parameter is the threshold of the homogeneity criterion. This criterion can be specified in a very intuitive way, e.g. variance of the luminosity in a certain environment, similarity of neighboring pixels, etc. If segments have to be merged, the tree structure specifies uniquely which segments are to be merged to arrive at larger segments. Finally, the tree itself gives a structural relation between the segments.

The advantage of the hierarchical segmentation, resulting in the tree 120, for the estimation of the motion vector 116 of segment C 104 is described below. The method of motion estimation according to the bottom-up approach comprises the following steps:

For segment C 104 a set $CS_c$ of candidate motion vectors $V_i$ is generated, where $V_i$ is the motion vector of a neighboring segment of C 104, i.e. 102,103,106–114.

The candidate motion vectors are ordered according to the position of the least common ancestor in the tree 120 of node C 140 and the neighboring segment under consideration. E.g. node 132 is the least common ancestor of node C 140 and node D 142.

The lower the position of the least common ancestor in the tree, the more relevant the candidate motion vectors $V_i$.

The set $CS_c$ of candidate motion vectors is restricted to only those K motion vectors $V_i$ which have the highest relevance.

In the situation of the prior art, the set of candidate motion vectors of segment C 104 would be $CS_c = \{V_A, V_B, V_D, V_E, V_F, V_G, V_H, V_R\}$ where $V_R$ is a random motion vector. However according to the invention it is allowed that $CS_c = \{V_B, V_D, V_A, V_R\}$ is taken, since from the tree structure it can be derived that the least common ancestor 122 of node C 140 and, e.g. node E 134 is so high up in the tree 120 that it is unlikely that segment C 104 and segment E 108 belong to the same object and have the same motion. In this case, K=3 is taken. In this manner, it is possible to restrict the number of candidate motion vectors to be tested. Since the selection of the candidate motion vectors is based on the tree structure of the segmentation, only the information from the most relevant neighboring segments is used. The result is a gain in efficiency, i.e. less candidate motion vectors to be tested without a loss in accuracy, since the non-tested candidate motion vectors are from segments which probably are part of different objects and thus less likely to have a similar motion.

FIG. 2A schematically shows the segments 202,204 and 206 for which motion vectors 208,210 and 212 are estimated. The tree 120 in FIG. 2A shows a state in the method according to a top-down approach: the second highest level of hierarchy of the tree. The nodes 124,126 and 128 correspond with the segments for which motion vectors are estimated. The principle of the top-down approach is described in connection with FIG. 3A.

FIG. 2B schematically shows the segments 202,216,214, 218 and 220 for which motion vectors 208,222,224,226 and 228 are estimated. The tree 120 in FIG. 2B shows a state in the method according to a top-down approach: the third highest level of hierarchy of the tree. The nodes 128,130, 132,134 and 135 correspond with the segments for which motion vectors are estimated. By comparing FIGS. 2A and 2B the effect of splitting segments into smaller segments on motion vectors can be seen. E.g. a motion vector 210 was estimated for segment 204 and the motion vectors 226 and 228 are estimated for the segments 214 respectively 216. E.g. a motion vector 212 was estimated for segment 206 and the motion vectors 222 and 224 are estimated for the segments 220 respectively 218.

FIG. 2C schematically shows the segments 202,216,218, 230,232,234 and 236 for which motion vectors 208,224,228, 238,240,244 and 242 are estimated. The tree 120 in FIG. 2C shows a state in the method according to a top-down approach: the lowest level of hierarchy of the tree. The nodes 128,130,134,138,140,142,144 and 146 correspond with the segments for which motion vectors are estimated. By comparing FIGS. 2B and 2C the effect of splitting segments into smaller segments on motion vectors can be seen. E.g. a motion vector 226 was estimated for the segment 214 and the motion vectors 238 and 240 are estimated for the segments 230 respectively 232. A motion vector 222 was estimated for the segment 220 and the motion vectors 242 and 244 are estimated for the segments 236 respectively 234.

FIG. 3A schematically shows elements of a motion estimator unit 300 designed for a top-down approach. The motion estimator unit 300 comprises:
- a generator 310 for generating a set of candidate motion vectors of a particular segment;
- a computing means 306 for computing for each candidate motion vector a match penalty;
- a selecting means 308 for selecting a particular motion vector from the set of candidate motion vectors on the basis of match penalties;
- a segmentation means 302 for generating a tree of the segments of the image, designed to perform a hierarchical segmentation; and
- an analyzing means 304 for analyzing the tree of the segments to control the generator 310.

The input of the motion estimator unit 300 comprises images and is provided at the input connector 312. The output of the motion estimator unit 300 are motion vectors of the segments. The behavior of the motion estimator unit 300 is as follows. First a hierarchical segmentation is performed by the segmentation means 302. This segmentation is performed as described in U.S. Pat. No. 5,867,605. The result of the segmentation is a tree of segments. The motion vectors of the segments of the tree are estimated by processing the tree of the segments recursively in a top-down direction. This is done according to the following procedure:
- The estimation of the appropriate motion vectors starts on high level of the tree, where the segments are still large.
- If no satisfactory motion vector is found for a segment, then motion vectors are estimated for all children of this node separately. A criterion for a satisfactory motion vector is that the match penalty of the particular motion vector is less then a predetermined threshold.
- The previous step is repeated recursively until satisfactory motion vectors are obtained.

In this manner, the number of segments to be matched is minimal, without sacrificing the accuracy. The process of estimating motion vectors continues until satisfactory motion vectors are obtained. The result is that only motion vectors are estimated for segments at a relatively high level in the tree. The advantage is that the process stops with the largest, and thus least noise-prone, segments possible.

FIG. 3B schematically shows elements of a motion estimator unit 301 designed for a bottom-up approach. Most of the elements of this motion estimator unit 301 are equal to those of the motion estimator unit 300 as described in FIG. 3A. The first generating means 310 for generating the set of candidate motion vectors comprises:
- a second generating means 303 for generating an initial list of candidate motion vectors comprising motion vectors of neighboring segments;
- an ordering means 305 for ordering the initial list of candidate motion vectors according to positions of the corresponding nodes within the tree; and
- a filter 307 to restrict the initial list of candidate motion vectors to candidate motion vectors with a relatively high order.

This tree is processed in a bottom-up approach. This means that for the leaves of the tree, i.e. smallest segments, sets of candidate motion vectors are determined as described in FIG. 1. When a set of motion vectors is determined for a particular segment the match penalties are calculated by the computing means 306. Then the selecting means 308 selects a particular motion vector from the set of candidate motion vectors on the basis of match penalties.

FIG. 4 schematically shows elements of a depth estimator unit 400. The depth estimator unit 400 comprises:
- a first generating means 310 for generating a set of candidate motion vectors of a particular segment;
- a computing means 306 for computing for each candidate motion vector a match penalty;
- a selecting means 308 for selecting a particular motion vector from the set of candidate motion vectors on the basis of match penalties;
- a segmentation means 302 for generating a tree of the segments of the image, designed to perform a hierarchical segmentation;
- an analyzing means 304 for analyzing the tree of the segments to control the first generating means; and
- a depth calculating means 402 for calculating depth data of the particular segment on the basis of the particular motion vector. The depth data might comprise a scalar depth value or a scalar depth value and an orientation of the object.

The input of the motion estimator unit 300 comprises images which are provided at the input connector 312 and camera calibration data which is provided at the input connector 416. The output of the motion estimator unit 300 are depth values for the segments. The behavior of the depth estimator unit 300 is as follows. First a hierarchical segmentation is performed by the segmentation means 302. This segmentation is performed as described in U.S. Pat. No. 5,867,605. The result of the segmentation is a tree of the segments that correspond with objects or parts of objects in the scene. For a particular object it is assumed that it has a depth relative to a pre-determined origin, e.g. the camera, with a value in a range of candidate values. This depth is related to motion of objects in the images. That means that if the motion of the object relative to the camera is known, then the depth can be estimated on the rules of parallax. This implies that motion vectors have to be calculated for estimating depth. The method of depth estimation is according to the method described in the article "Depth from motion using confidence based block matching" in Proceedings of Image and Multidimensional Signal Processing Workshop, pages 159–162, Alpbach, Austria, 1998. In FIG. 4 it is depicted that the selecting means 308 provides the particular motion vector of a segment to the depth calculating means 402. The motion estimation can be as described in FIG. 3A or as described in FIG. 3B.

FIG. 5 schematically shows elements of an image processing apparatus 500 comprising:
- receiving means 501 for receiving a signal representing images to be displayed after some processing has been performed. The signal may be a broadcast signal received via an antenna or cable but may also be a signal from a storage device like a VCR (Video Cassette Recorder) or Digital Versatile Disk (DVD). The signal is provided at the input connector 506.
- a motion estimator unit 300 or 301 as described in connection with FIG. 3A respectively FIG. 3B;
- a motion compensated image processing unit 502; and
- a display device for displaying the processed images.

The motion compensated image processing unit 502 supports the following types of processing:

De-interlacing: Interlacing is the common video broadcast procedure for transmitting the odd or even numbered image lines alternately. De-interlacing attempts to restore the full vertical resolution, i.e. make odd and even lines available simultaneously for each image;

Up-conversion: From a series of original input images a larger series of output images is calculated. Output images are temporally located between two original input images; and Temporal noise reduction.

The motion compensated image processing unit 502 requires images and motion vectors as its input. In case of a 3D display device, e.g. with a lenticular screen, the depth values can be used to render 3D images.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitably programmed computer. In the unit claims enumerating several means, several of these means can be embodied by one and the same item of hardware.

The invention claimed is:

1. A method of motion estimation of segments (102–114) of an image (100), wherein the segments satisfy a homogeneity criterion, comprising the steps of:
    generating a set (118) of candidate motion vectors of a particular segment (104);
    computing for each candidate motion vector a segment-based match penalty; and
    selecting a particular motion vector (116) from the set (118) of candidate motion vectors on the basis of a respective match penalty,
characterized in further comprising the steps of:
    generating a tree (120) of the segments (102–114) of the image (100) by performing a hierarchical segmentation, wherein the level of a segment within the tree is based on the segment's homogeneity criterion satisfying a known threshold; and
    analyzing the tree (120) of the segments (102–114) to control the generation of the set (118) of candidate motion vectors of the particular segment (104).

2. A method of motion estimation as claimed in claim 1, characterized in that motion vectors of the segments (102–114) of the tree (120) are estimated by processing the tree (120) of the segments (102–114) recursively in a top-down direction.

3. A method of motion estimation as claimed in claim 2, wherein if a match penalty of the particular motion vector (116) is unsatisfactory, then motion vectors are estimated of segments (102–114) that correspond to children of a node of the tree (120) that corresponds to the particular segment (104).

4. A method of motion estimation as claimed in claim 1, characterized in that the motion vectors of the segments (102–114) of the tree (120) are estimated by processing the tree (120) of the segments (102–114) in a bottom-up direction.

5. A method of motion estimation as claimed in claim 4, characterized in that the step of generating the set (118) of candidate motion vectors of the particular segment (104) comprises the following sub-steps of:
    generating an initial list of candidate motion vectors comprising motion vectors of neighboring segments (102–114);
    ordering the initial list of candidate motion vectors according to positions of the corresponding nodes (122–146) within the tree (120); and
    restricting the initial list of candidate motion vectors to candidate motion vectors with a relatively high order, resulting in the set (118) of candidate motion vectors.

6. A motion estimator unit (300,301) for motion estimation of segments (102–114) of an image, wherein the segments satisfy a homogeneity criterion, comprising:
    a first generating means (310) for generating a set (118) of candidate motion vectors of a particular segment (104);
    a computing means (306) for computing for each candidate motion vector a segment-based match penalty; and
    a selecting means (308) for selecting a particular motion vector (116) from the set (118) of candidate motion vectors on the basis of respective match penalties,
characterized in further comprising:
    a segmentation means (302) for generating a tree (120) of the segments (102–114) of the image, designed to perform a hierarchical segmentation, wherein the level of a segment within the tree is based on the segment's homogeneity criterion satisfying a known threshold; and
    an analyzing means (304) for analyzing the tree (120) of the segments (102–114) to control the first generating means (310).

7. A motion estimator unit (300) as claimed in claim 6, characterized in being designed to estimate motion vectors of the segments (102–114) of the tree (120) by processing the tree (120) of the segments (102–114) recursively in a top-down direction.

8. A motion estimator unit (300) as claimed in claim 7, characterized in being designed to estimate motion vectors of segments (102–114), corresponding to children of a node of the tree (120) that corresponds to the particular segment (104), if a match penalty of the particular motion vector (116) is unsatisfactory.

9. A motion estimator unit (301) as claimed in claim 6, characterized in being designed to estimate motion vectors of the segments (102–114) of the tree (120) by processing the tree (120) of the segments (102–114) in a bottom-up direction.

10. A motion estimator unit (301) as claimed in claim 9, characterized in that the first generating means (310) for generating the set (118) of candidate motion vectors of the particular segment (104) comprises:
    a second generating means (303) for generating an initial list of candidate motion vectors comprising motion vectors of neighboring segments (102–114);
    an ordering means (305) for ordering the initial list of candidate motion vectors according to positions of the corresponding nodes (122–146) within the tree (120); and
    a filter (307) to restrict the initial list of candidate motion vectors to candidate motion vectors with a relatively high order.

11. An image processing apparatus (500) comprising:
    a motion estimator unit (300,301) for motion estimation of segments (102–114) of an image (100), wherein the segments satisfy a homogeneity criterion, comprising:
        a generator (310) for generating a set (118) of candidate motion vectors of a particular segment (104);

a computing means (306) for computing for each candidate motion vector a segment-based match penalty; and a selecting means (308) for selecting a particular motion vector (116) from the set (118) of candidate motion vectors on the basis of respective match penalties; and a motion compensated image processing unit (502), characterized in that the motion estimator unit (300,301) comprises:

a segmentation means (302) for generating a tree (120) of the segments (102–114) of the image (100), designed to perform a hierarchical segmentation method, wherein the level of a segment within the tree is based on the segment's homogeneity criterion satisfying a known threshold; and an analyzing means (304) for analyzing the tree (120) of the segments (102–114) to control the generator (310).

* * * * *